United States Patent [19]

Newman

[11] Patent Number: 5,123,091
[45] Date of Patent: Jun. 16, 1992

[54] DATA PROCESSING SYSTEM AND METHOD FOR PACKETIZING DATA FROM PERIPHERALS

[75] Inventor: Bruce E. Newman, North Plainfield, N.J.

[73] Assignee: Digital Equipment Corporation, Maynard, Mass.

[21] Appl. No.: 85,098

[22] Filed: Aug. 13, 1987

[51] Int. Cl.$^5$ .............................. G06F 13/00
[52] U.S. Cl. ........................ 395/200; 395/325; 395/275; 364/238.2; 364/239.3; 364/239; 364/239.6; 364/239.7
[58] Field of Search ... 364/200 MS File, 900 MS File; 370/85, 94, 60, 67; 371/16

[56] References Cited

U.S. PATENT DOCUMENTS

| | | | |
|---|---|---|---|
| 3,693,155 | 9/1972 | Crafton et al. | 340/825.02 |
| 4,019,174 | 4/1977 | Vanderpool et al. | 364/900 |
| 4,408,323 | 10/1983 | Montgomery | 370/60 |
| 4,577,314 | 3/1986 | Chu et al. | 370/94 |
| 4,577,317 | 3/1986 | Chu et al. | 370/94 X |
| 4,630,262 | 12/1986 | Callens et al. | 370/81 |
| 4,730,308 | 3/1988 | Friedman et al. | 370/94 X |
| 4,748,618 | 5/1988 | Brown et al. | 370/94 |
| 4,751,699 | 6/1988 | Tarrider et al. | 370/84 |

FOREIGN PATENT DOCUMENTS

| | | |
|---|---|---|
| 0068992 | 5/1983 | European Pat. Off. |
| 2601474 | 1/1988 | France |
| 60-41347 | 3/1985 | Japan |

OTHER PUBLICATIONS

Starr, Robert R., "The Hewlett-Packard Human Interface Link", Hewlett-Packard Journal, vol. 38, No. 6, Jun. 1987.

Rothhaupt, Thomas, "16-Bit-Mikrocontroller Steuert Multifunktions-Tastatur" Elektronik, vol. 36, No. 13, Jun. 1987.

Primary Examiner—Thomas C. Lee
Assistant Examiner—Larry Donaghue
Attorney, Agent, or Firm—Kenyon & Kenyon

[57] ABSTRACT

In a system including a host and a peripheral repeater having at least one peripheral coupled thereto, data from the peripheral is packetized at the peripheral repeater and sent to the host. This is done by establishing a baud rate for the peripheral, accumulating messages from the peripheral into packets and terminating and transmitting a packet. The terminating and transmitting is performed if a predetermined time based on the baud rate passes without receiving a byte from the peripheral.

7 Claims, 16 Drawing Sheets

FIG. 5

| CHANNEL NUMBER | DEFAULT BAUD RATE |
|---|---|
| 0 | 4800 |
| 1 | 4800 |
| 2 | 4800 |
| 3 | 9600 |
| 4 | 9600 |
| 5 | 9600 |
| 6 | 1200 |
| 7 | 19200 |

FIG. 6

| BAUD RATE | TIMER VALUE (IN HEX) |
|---|---|
| 50 | FF |
| 75 | FF |
| 110 | D6 |
| 134.5 | AA |
| 150 | 80 |
| 300 | 40 |
| 600 | 20 |
| 1200 | 10 |
| 1800 | 0C |
| 2000 | 0A |
| 2400 | 08 |
| 3600 | 06 |
| 4800 | 04 |
| 7200 | 02 |
| 9600 | 02 |
| 19200 | 02 |

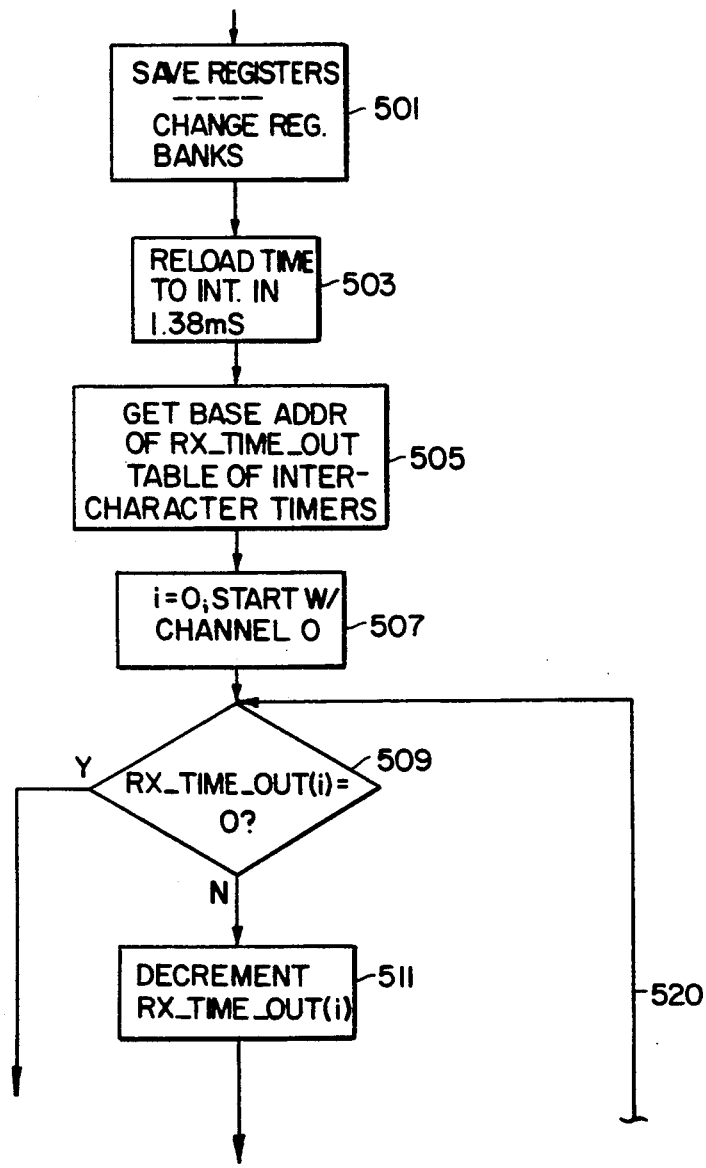

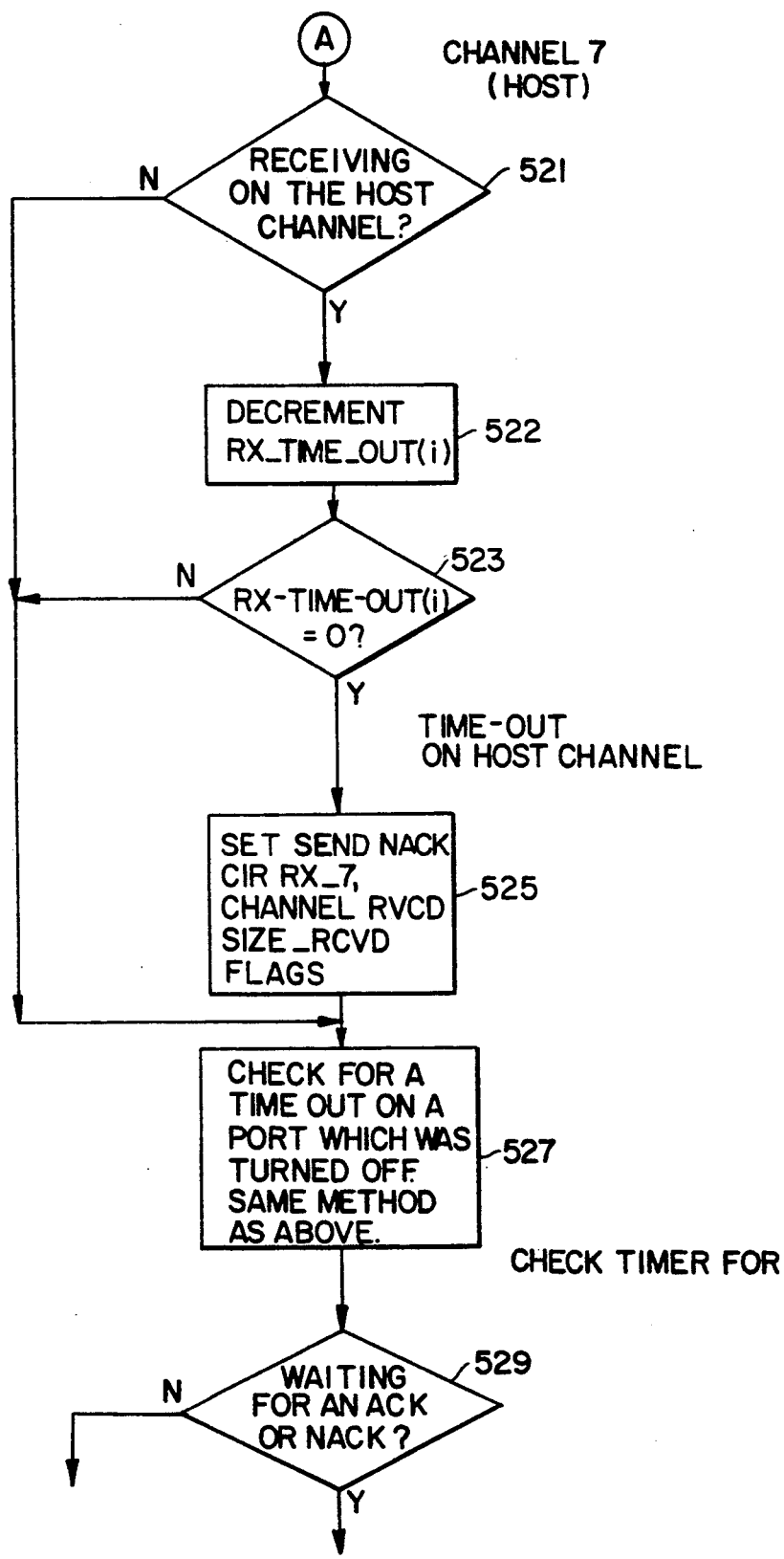

DATA PROCESSING SYSTEM AND METHOD FOR PACKETIZING DATA FROM PERIPHERALS

RELATED APPLICATIONS

This application is related to the following applications filed on even date herewith, the disclosure of which is hereby incorporated by reference. These applications contain, at least in part, common disclosure regarding an embodiment of a peripheral repeater box. Each, however, contains claims to a different invention.
Peripheral Repeater Box, U.S. Ser. No. 085,097; now U.S. Pat. No. 4,905,232.
D.C. Power Monitor, U.S. Pat. No. 4,797,608.
Tri-State Function Indicator, Ser. No. 084,845; now U.S. Pat. No. 4,837,565.
System of Permitting Peripheral Interchangeability, U.S. Ser. No. 085,105, now U.S. Pat. No. 4,862,354.
Communications Protocol, U.S. Ser .No. 085,096, now U.S. Pat. No. 4,860,292.
Method of Changing Baud Rates, U.S. Ser. No. 085,084, now abandoned.

BACKGROUND OF THE INVENTION

This invention relates to computer systems in general and more particularly, to a method of packetizing data in a system where communication between different devices takes place.

In large computer systems, and particularly in systems which provide graphics displays, a plurality of different types of peripheral devices for providing input to the computer system are provided. For example, a single system may have as inputs a keyboard, a mouse, a tablet, a light pen, dial boxes, switch boxes and so forth. In a system with a plurality of such peripherals it is advantageous to have a device which can collect inputs from each of these peripherals and then retransmit the various inputs over a single line to the computer system. Such a device is referred to herein as a peripheral repeater box in that it acts as a repeater for each of the individual peripherals.

In such a system there is a need to establish data protocols for the peripheral box to communicate with the peripherals and with the computer system. Ideally, such should be simple, trouble-free and efficient.

SUMMARY OF THE INVENTION

The method of the present invention provides a method of packetizing data which aids in such communication. Although disclosed in the setting of a peripheral repeater box, the method is generally applicable in a data transmission system.

The Peripheral Repeater box (PR Box) of the present invention is, first of all, used to allow the peripherals to be powered at the Monitor site. The PR box collects the various peripheral signals using, a conventional RS-232-C or RS-423 connection, from seven peripheral channels, which are then packetized and sent to a host, e.g. a computer and/or graphics control processor, using RS-232-C signals. Transmissions to the peripherals are handled in a like manner from the host, i.e., receiving packets from the host, unpacking the data and channeling data to an appropriate peripheral serial line unit (SLU).

The peripheral repeater box of the present invention is particularly suited for use in a graphics system of the type disclosed in copending application Ser. Nos. 084,930, now U.S. Pat. No. 4,903,218 and 085,081, still pending, entitled Console Emulation For A Graphics Workstation and High Performance Graphics Workstation, filed on even date herewith, the disclosure of which is hereby incorporated by reference.

The communications between the PR Box and host are carried out with a novel protocol, which provides for reliable error free transmission.

The PR box uses a system with circular queues and buffers to buffer incoming and outgoing messages to and from the peripherals. Messages are arranged in packets for transmission. In accordance with the method of the present invention, the completion of a message from a peripheral is detected by counting bytes.

Alternatively if the time between received bytes exceeds a predetermined amount, this is used to sense the end of a message.

To keep communications active between the PR box and the system, a "keep alive" timer is used. This causes a "keep alive" message to be sent if there has been no other communication within a predetermined amount of time.

Peripherals which are supported by the disclosed embodiment of the PR box include:
a keyboard;
a mouse;
a tablet; and
a dial box.

In addition, in the illustrated embodiment, three other channels are provided for future expansion to provide for a button box channel, a spare keyboard channel and a general spare RS-232-C channel.

BRIEF DESCRIPTION OF THE DRAWING

FIG. 5 is a table tabulating the default baud rates for the different peripherals used in the preferred embodiment of the present invention.

FIG. 6 is a table showing the character times associated with each baud rate for use in interpacket timing according to the present invention.

FIGS. 7A, 7B, 7C, 7D, 7E is a flow diagram illustrating the basic timing utilized for interpacket timing.

DETAILED DESCRIPTION

System Overview

Figure 1:
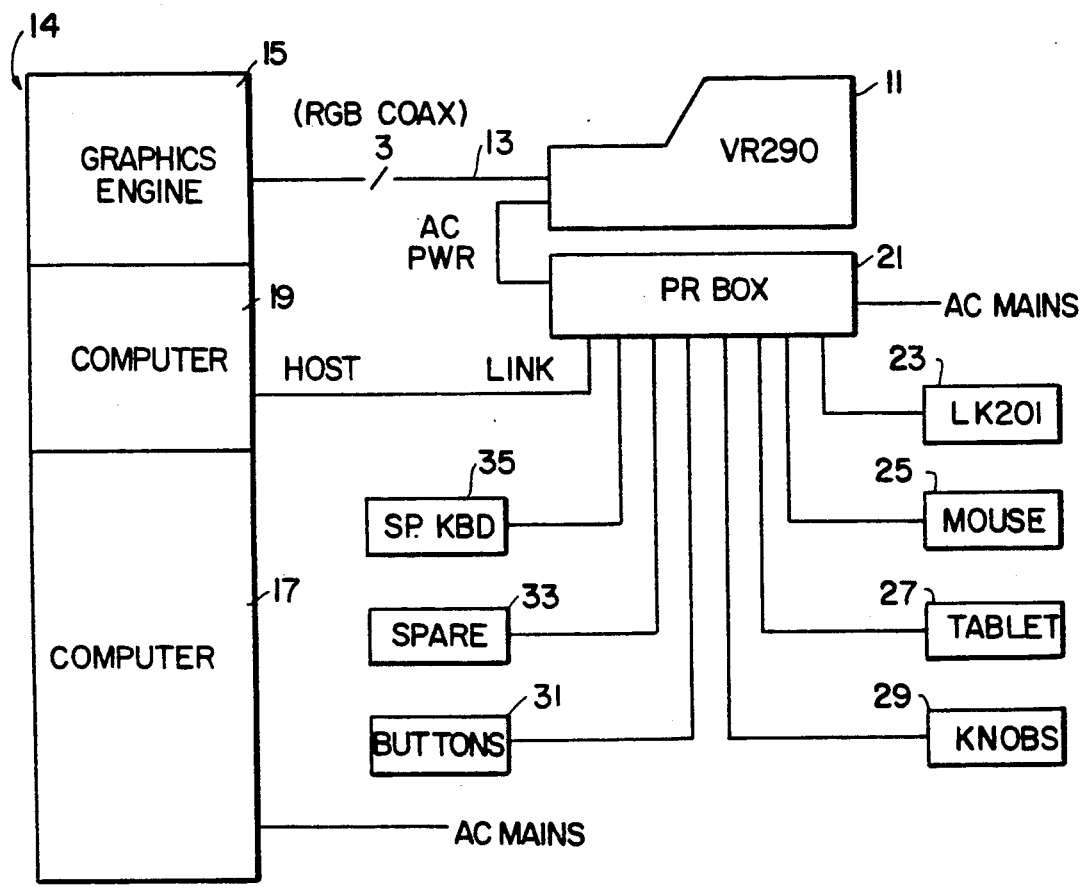
FIG. 1 is a block diagram of a computer system in which the PR box of the present invention may be used.

FIG. 1 is a block diagram of a computer system showing where the peripheral repeater box of the present invention fits into the system. The illustrated system is a graphics system. However, the present invention is applicable to other computer systems. Thus, there is illustrated a monitor 11 which receives video input from a RGB coax 13 which is coupled to computing apparatus 14 which does the graphic computations.

Included in apparatus 14, as illustrated, is a graphics engine or graphics processor 15, a main computer 17, e.g. a Vax 8250 system, and a computer 19 acting as a control processor, which may be a Microvax computer. Computer 17 is host to computer 19 and computer 19 is host to the PR box 21 described below. Thus, hereinafter, where reference is made to a host, the reference is to computer 19. The operation of this part of the system is more fully described in applications Ser. Nos. 084,930, now U.S. Pat. No. 4,903,218 and 085,081, still pending, entitled Console Emulation For A Graphics Workstation and High Performance Graphics Workstation, filed on even date herewith. The peripheral repeater box 21 is illustrated in FIG. 1 along with the various peripherals which may be plugged into it. These include a keyboard 23, a mouse 25, a tablet 27, knobs 29, i.e. a dial box, buttons 31, a spare RS232 channel 33 and a spare keyboard input 35.

The peripheral repeater box is a self-contained microprocessor system which, in the illustrated embodiment, is located underneath the monitor. It is responsible for handling information flowing between the host and peripheral devices. This is a free running sub-system that performs a self-check of its own internal status at power up. After completing this task it initializes itself and continuously scans for activity from the host or peripherals.

Four peripheral channels (for keyboard 23, mouse 25, tablet 27 and knobs 29) and one command channel (for communications with the host) are provided to connect all the supported peripherals. In addition three spare channels for future expansion or special peripherals, e.g. the spare keyboard 35, button box 31, and spare 33 of FIG. 1 have been provided.

Figure 2:
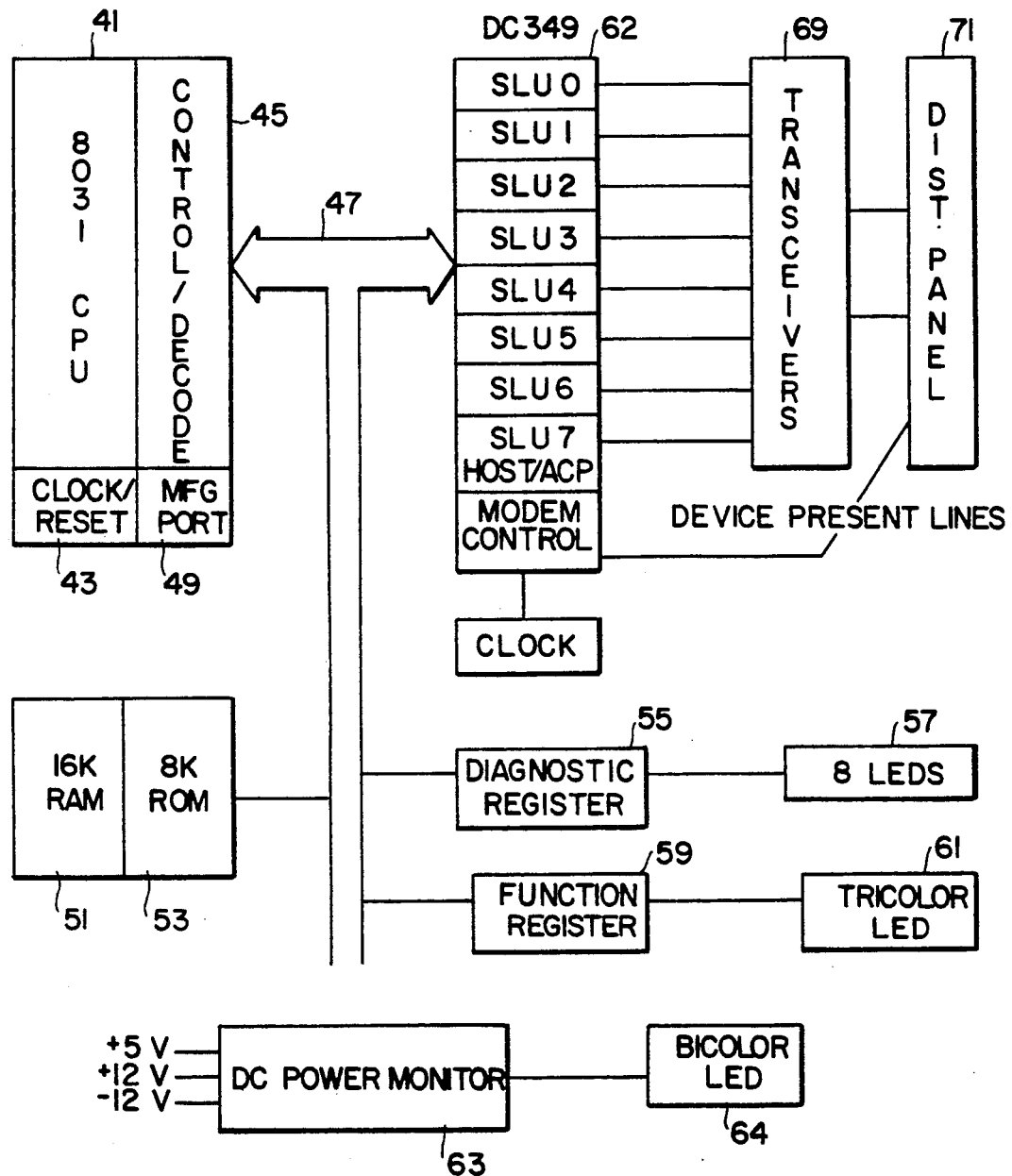
FIG. 2 is a basic block diagram of the PR box of the present invention.

The sub-system is composed of a minimal system as shown in FIG. 2. Thus, there is illustrated an 8031 microprocessor CPU 41 which, in conventional fashion, has a associated with it a clock/reset unit 43 with a 12 mHz crystal oscillator. Coupled to the 8031 CPU is a conventional control decode block 45 which couples the CPU to a bus 47. Bus 47 couples the CPU to memory 49 which includes 16K of RAM 51 and 8K of ROM 53. The 8031 has no on chip ROM and insufficient on chip RAM. For this reason, the 8031 is used in an expanded bus configuration utilizing three of the four available general purpose ports for address, data and control. These are coupled through block 45 to bus 47. Enabling the external addressing capability for the expanded bus configuration is accomplished by grounding (through a jumper) the EA, external access, pin.

The low order address and data are multiplexed on the 8031, the address is latched during address time with a 74LS373 Octal latch strobed via the ALE (address latch enable) signal output from the 8031.

Bus 47 is also connected to a diagnostic register 55. Diagnostic register provides an output to a display 57 comprising 8 LEDs. Also coupled to bus 47 is a function register 59 which provides its output to a tricolor LED 61 to be described in more detail below. Also shown in FIG. 2 is the DC power monitor 63 which provides its output to a bicolor LED 64 to indicate under or over voltage conditions as explained in detail below.

Bus 47 also connects to Serial Line Units (SLU) 0-7 along with a modem control contained in block 62. Block 62 is what is known as an octal asynchronous receiver/transmitter or OCTALART. Such a device is manufactured by Digital Equipment Corporation of Maynard, Mass. as a DC 349. Basically, the OCTALART comprises eight identical communication channels (eight UARTS, in effect) and two registers which provide summary information on the collective modem control signals and the interrupting channel definition for interrupts. Serial line units 0-6 are coupled to the seven peripherals indicated in FIG. 1. SLU 7 is the host link shown in FIG. 1. The outputs of the SLUs are coupled through transceivers 69, the outputs of which in turn are connected to a distribution panel 71 into which the various connectors are plugged. Block 69 includes EIA Line drivers, 9636 type, operating off a bipolar supply of $+/-12$ volts which translate the signals from TTL levels to a bipolar RS-232-C compatible signal level of approximately $+/-$ 10 volts.

The host channel (SLU 7), keyboard channel and spare channel do not have device detection capability. The other five channels have an input line that is connected to the DCD (Data Carrier Detect) pin of the corresponding SLU of the OCTALART 62. When the pin is at the channel connector side is grounded the input side of the OCTALART is high indicating that a device is present on that channel.

A data set change summary register in block 62 will cause an interrupt if the status of one of these pins changes, i.e. high to low, or low to high level change. This indicates a device being added or removed after the system has entered operating mode. On power up the 8031 reads this register to determine which devices that have this capability are connected and enter this information into a configuration byte (a storage area in software) and is sent to the host as part of the self test report. This capability permits knowing which peripherals are connected to which ports and thus allows interchangeability of peripherals. The PR box, each time a peripheral is plugged in or unplugged, sends a message to the host allowing it to interrogate a peripheral and update a table which it maintains.

In the free running operational mode the PR box accepts data packets from the host through SLU 7 and verifies the integrity of that data. If the data is good then the PR box sends an ACK to the host, strips out the data or command from the packet and channels it to the designated peripheral through its associated SLU. If the data is bad, i.e. checksum error, the PR box sends a NAK to the host to request a re-transmission and throws away the packet it had received. These communications are described in detail below in connection with FIGS. 5C through 11C.

The PR box can also receive commands to test itself and report status/configuration to change the diagnostic LEDs and to change baud rates while in operational mode.

Self-test mode verifies the integrity of the microprocessor sub-system. After termination of the internal loopback of the OCTALART, the sub-system will re-initialize itself and return to operational mode. Self-test is entered on power-up or by receipt of an executed self-test command from the host. This will check the functionality of the PR box logic.

An internal loopback sub-test is provided in the self-test, allowing the system to verify the integrity of the PR box logic under software control. While the self test is in operation there is no logical connection between the host and the PR box. This is true only during self-test. There is no effect on the peripherals when the PR box is running the internal loopback portion of self-test because no data is output at the transmit pins of the UART lines in OCTALART 67. Additionally data coming in from the peripherals will have no effect on the PR box during loopback test since all data at the UART receive pins of OCTALART 67 is ignored.

External loopback testing may be performed on an individual peripheral channel using the appropriate loopback on the channel to be tested. This is done from the host firmware. The peripheral repeater is transparent from this operation. This is the testing, explained further below which allows peripheral interchangeability.

A manufacturing test moded is provided by a jumper in the host channel loopback connector. This jumper is sensed on an 8031 on the power-up. In this mode the module runs all tests (as in self-test) on all channels and a device present test, and an external peripheral channel loopback test, continually. Loop on error functionality has been implemented to aid in repair.

The eight bit diagnostic register 55 with eight LEDs 57 attached provides the PR box status and some system status, (assuming some basic functionality of the main system). This register is used by the PR box to indicate its dynamic status during self-test or manufacturing test, to indicate, on entry to operational mode, any soft or hard error that may have occurred. The MSB, (bit 7) is used to indicate that a PR box error has occurred, bit 6 is used to indicate that a system error is displayed. If bit 6 is lit then the error code displayed is the system error, regardless of bit 7. This leaves 6 bits for providing encoded error responses. (The LED Error Codes are listed below.)

The Power Monitor Circuit

The circuitry 63 to monitor the plus and minus 12 v supplies operates from the +5 v. supply. A single red/-green bicolor led 64 is connected to the output of the power monitor circuit 63. The output indicators are as follows:

| LED Indication | Description |
| --- | --- |
| Green | All voltages present and within range |
| Red | Either plus, minus or both 12 volt supplies are approximately 15% out of spec or dropped out completely |
| None | +5 v supply, all supply voltages dropped out or no AC |

The DC power monitor is a set of four comparators to check undervoltage and overvoltage out of range approximately 15% at nominal for the plus and minus 12 volt supplies. The circuit runs from plus five volts and uses a plus two volt precision reference applied to the appropriate reference input of each comparator. The output is connected to bicolor LED 64. Precision resistor dividers connected to the other input of each comparator, scale the test voltage down to the same range as the reference input.

The Function Monitor

As shown in FIG. 2, a tristate LED 61 is connected to the output of two bit function register 59. This is used to give visual indication of what mode or function the PR box is performing at that time.

| LED Indication | Description |
| --- | --- |
| Yellow | Self-test mode being executed |
| Red | Manufacturing test being performed |
| Green | Operational mode active |

PR Box Operation Overview

Figure 3A:
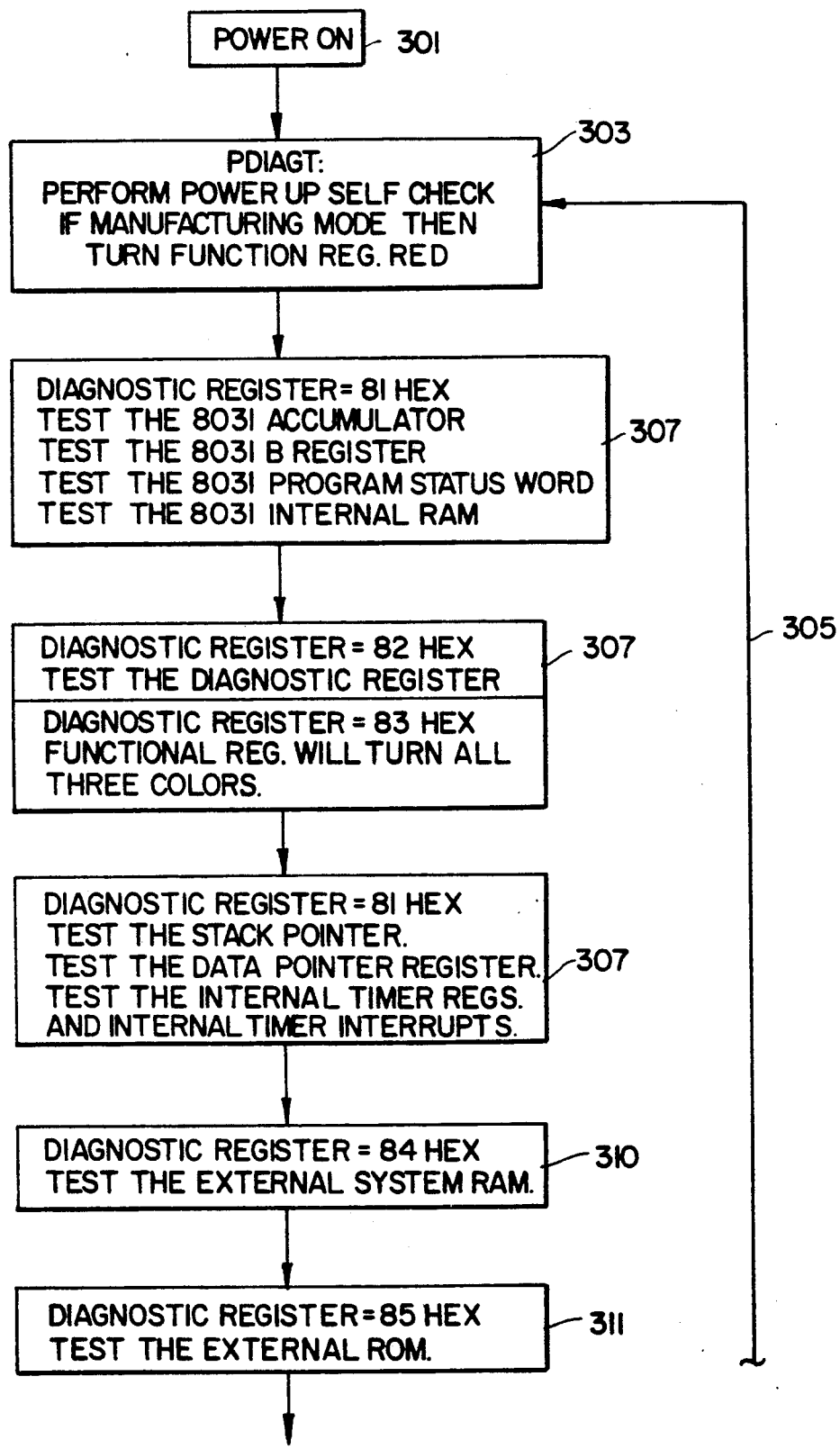
FIGS. 3A, 3B, 3C are a flow diagram of the firmware running in the PR box of the present invention.
Figure 3B:
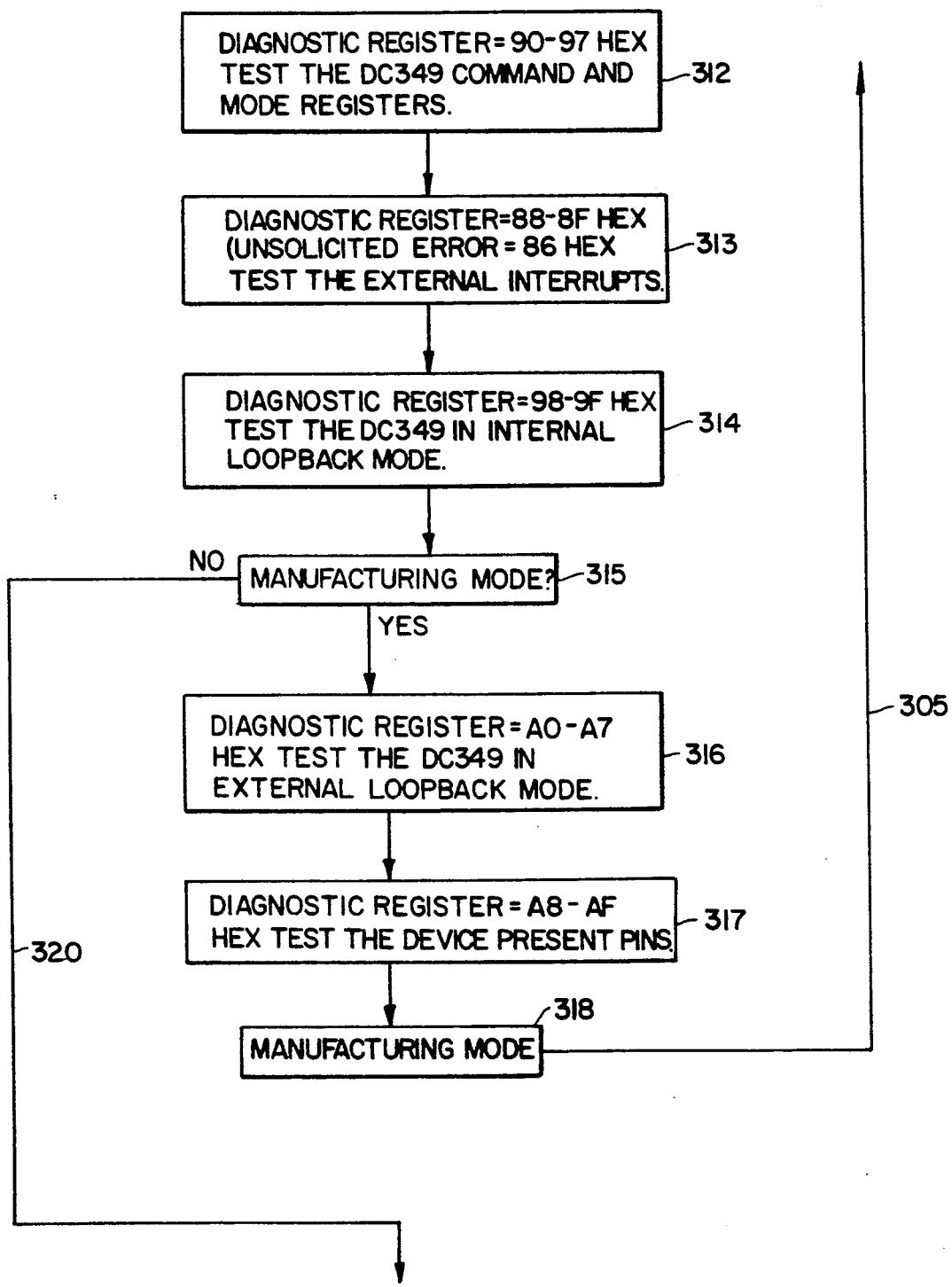

The PR box ROM 53 contains self-test and operational firmware. This firmware is contained in 4K bytes of ROM, though there is 8K bytes reserved for it. A listing of the firmware is available in application file. A flow diagram for the firmware is set out in FIGS. 3A-C.

On power-up indicated by block 301, the on board diagnostics will have control of the PR box as indicated in block 303. The diagnostics will perform tests on the PR box logic and do an external loopback and test if pin 7 on the 8031 port 1 is grounded (signifying manufacturing mode). In manufacturing mode the diagnostics will loop forever via loop 305 and not go into operational mode. This is done via detection of the loopback connector (pin 7) on power up. If an error is encountered during manufacturing mode, the diagnostics will loop forever on the test that encountered the error.

Registers 55 and 59 with LEDs 57 and 61 (see FIG. 2) attached can be viewed from the outside of the system box. Diagnostic register 55 as noted above is 8 bits wide with Red LEDs. These LEDs report errors for the PR box and/or the system. As also described, the function register 59 is two bits wide with a single red/yellow/-green LED. When in manufacturing mode, the function LED is red as indicated in block 303. On power-up, during other than manufacturing mode, the function LED will be yellow. In operational mode it will be green.

The various tests performed on power up are indicated by blocks 307-314. If in manufacturing mode, as checked in block 315 of FIG. 3B, the test of blocks 316 and 317 are also performed before entering block 318 to loop 305.

If, on power up, the PR box has an error that will make the PR system unusable, i.e. interrupt, 8031 errors, the function LED will stay yellow, an attempt to put the error code in the diagnostic register will be made, and the PR box will not go into operational mode.

Figure 3C:
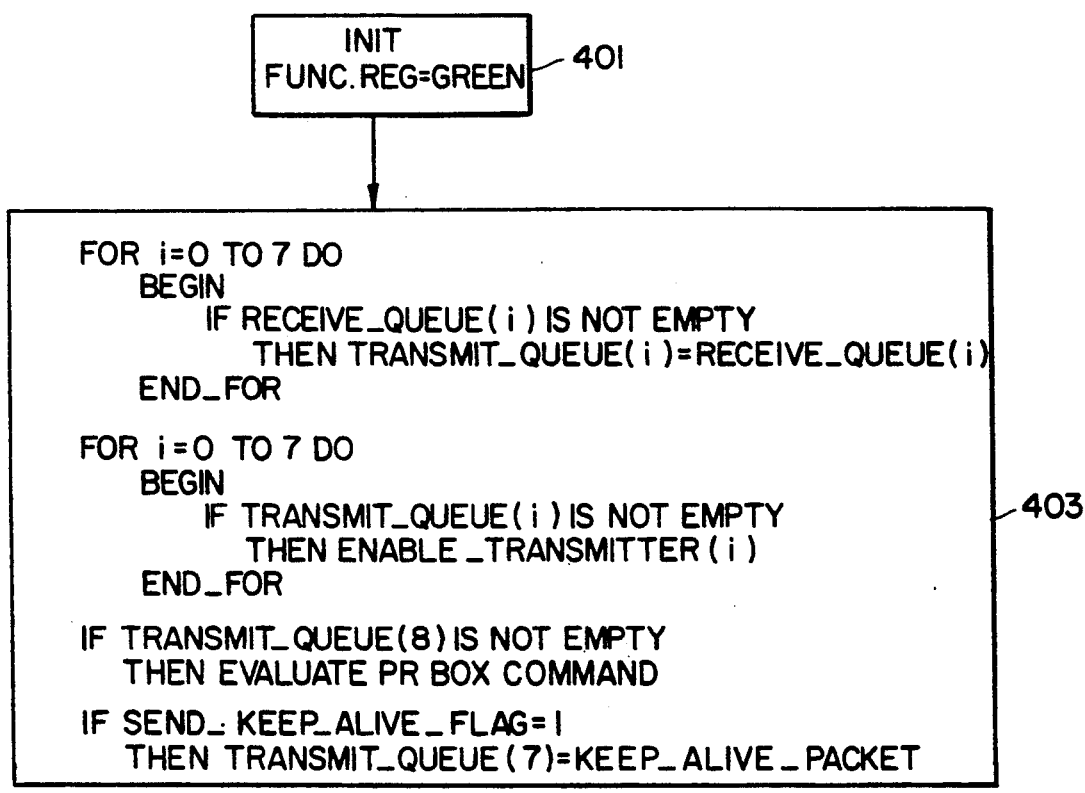

If there are no errors or errors that will not make the system unuseable, and the system is not in manufacturing mode, path 320 will be followed to block 401 of FIG. 3C and the function LED will turn green and wait for the host to ACK/NAK, the diagnostic report to establish the link between the host and the PR box. If the link is never established, the error code for NO host is placed into the diagnostic LEDs, and the PR box will go into operational mode. If the communications link is later established, the error code will be cleared.

If there are soft errors (diagnostic register or function register) the PR box will go into operational mode of FIG. 3C and carryout the background process. However, any LED indication may be incorrect. Except for a dead system, i.e. 8031 failures, the PR box will attempt to go operational mode, displaying , if possible, the point at which it failed the self-test, (test number).

After the power-up diagnostics have been completed, control is passed to the operational firmware. In this mode, the firmware will keep the link between the host and the PR box active, and mux/demux commands/data between the peripherals and the host. This operation is described in detail below.

The diagnostics/operating system of this system are ROM based and run out of the 8031 microprocessor software program listing is available in application file. The PR box firmware is compatible with the existing peripherals, and adheres to a communications protocol developed for the host PR box link discussed below.

The diagnostics are the first part of the firmware to run on power-up of the PR box. The diagnostics leave the system in a known state before passing control to the operating firmware. Upon completion of testing the PR box, the system RAM 51 is initialized, queues are cleared, the UARTs in in OCTALART 67 are set to the default speeds and data formats, the diagnostic and mode registers 55 and 57 are set with the appropriate values, and a system status area is set up that contains the status of the PR box.

Once the diagnostics are complete, the diagnostic report is sent to the host, and the PR box goes into operational mode. If there are no other messages to send, the PR box will wait 10 seconds for an ACK-/NAK before placing an error code for "No communications link" into the diagnostic register 55. An ACK-/NAK timer is provided for all other packets and times out at 20 mSec. Once operational, the UARTS are enabled to allow communications between the peripherals and the host. A keep-alive timer is also enabled in order to keep the host link active.

Operational Mode

In this mode, the PR box 21 is the central communications device sitting between the peripherals and the host 19. (Refer to FIG. 1 block diagram). Before detailing this mode, some basic terminology and memory allocation utilized on the PR box must be discussed.

A page of memory is 256 bytes in length. The low order address of the beginning page of memory is zero, the upper byte is from 0 to 255. In this description, the term "port" is used interchangeably with "channel" and refers to the peripheral port.

The 8031 has 128 bytes of on-chip RAM. Of the 128 bytes, 36 are utilized for front, rear, receive and transmit queue pointers. There is a front and rear queue pointer for each receive and transit queue. Receive and transmit queues are allocated for each SLU port and the command queue to the PR box. There are eight ports and one command channel, thus, there are 18 queues and 36 pointers. Listed below are the names given to the respective queue pointers.

| | |
|---|---|
| REAR_RX_QUE_PTR | A table containing the rear receive queue pointers for ports 0-7, & the cmd que 8 |
| FRONT_RX_QUE_PTR | A table containing the front receive queue pointers for ports 0-7, & the cmd que 8 |
| REAR_TX_QUE_PTR | A table containing the rear transmit queue pointers for ports 0-7, & the cmd que 8 |
| FRONT_TX_QUE_PTR | A table containing the front transmit queue pointers for ports 0-7, & the cmd que 8 |

The receive and transmit queues are maintained in off-chip RAM. Each queue entry is an address of the buffer received, or the buffer ready to be transmitted. Each entry is a word in length, a word being 16 bits. The first byte is the low order address, and the second byte is the high order address. No buffers are moved, only buffer addressed. Listed below are the names assigned to critical memory locations.

| | |
|---|---|
| RX_i_QUE | Where i = 0 to 7, and the CMD que-1 page (256 bytes-128 msg ptrs) |
| TX_i_QUE | WHERE i = 0 to 7, and the CMD que-1 page (256 bytes-128 msg ptrs |
| CHi_BUFFER | Where i = 0 to 7. Buffer space for each port. Ports 0 to 7 are the following sizes 3/4K, 2K, 2K, 1.5K, 3/4K, 3/4K, 3/4K, 2.75K respectively. |
| RX_BUFFERS | 16 bytes (8 addresses, one for each SLU, there is no buffer associated with the command queue) - Contains the next free byte in each ports buffer. |
| TX_BUFFERS | 16 bytes (8 addresses, one for each SLU, there is no buffer associated with the command queue) - Contains the next byte to transmit for each port. (Transmitter interrupt sets this up) |
| TX_SIZE_TBL | Number of bytes left to transmit for each channel. (8 locations) |
| RX_TIME_OUT | Timer bytes for each receiver channel. For inter-character timing. (8 locations) |
| PORT_TIME_OUT | Timers for each channel. Set to 10 mS when a queue is overflowed. (Port is turned off for 10 mS) (8 locations) |
| KA_TIMER | Keep alive timer. A 10 second timer which is reset to 10 whenever a packet is sent to the host. If the timer times out, a keep alive packet is sent to the host. |
| ACK_NACK_TIMER | Timer set to 20 mS after the checksum on a packet is sent to |

-continued

| |
|---|
| the host. (The timer is cleared if it receives an ACK or a NACK in this time period. If an ACK/NACK is not received, an error LED is set on the PR Box.) |

The method by which all pointers, queues, buffers, and tables are accessed is by getting the base address (or base page), and adding in the current channel number (or a multiple of the channel number). For example, to access channel 3 queue, the base page of the receive queues are taken. The upper address e.g. Base_Rx_P-AGE, which is the base for all front queues is taken and the channel number is added to it (3 in this case) Once this is done, the value pointed to by FRONT_RX QUE_PTR plus the offset of 3 is used as the lower address for the front pointer of channel 3. The channel number is obtained easily by reading it from a register in the OCTALART which, while in an OCTALART interrupt, stores the number of the channel causing an interrupt. Thus, for example, if data comes in from channel 3, it causes an OCTALART interrupt. The channel (3) is stored in an OCTALART register. The PR box reads this register and add its value (3) to the base values and this way quickly and easily obtains the necessary addresses for the pointers etc. for channel 3. Thus, all the queues, buffers, etc. can be treated generically by common subroutines, and interrupt routines, with the exception of Channel 7, which is treated slightly differently because it is the channel to which the host is connected.

All queues and buffers are circular. The queues are circular by virtue of the fact that they are only one page in length. The upper page address is loaded directly into the P2 register of the 8031. The front/rear receiver/transmit queue pointers are loaded directly into register R0 or R1 of the 8031 which can be used for external accesses. Since the pointers are 1 byte, (R0/R1) when they are incremented (by 2) from FE hex they will automatically be set to 0. (FE hex+2=100 hex, but since it is a byte value the 1 is tossed away.) No data checking is necessary because P2 and R0/RI are separate registers and the one does not carry to the upper address byte (P2).

Once in operational mode, the PR box will initialize all the channels to default baud rates for the peripherals it expects to be on a specific channel. The default baud rates are set out in the table of FIG. 5. Upon this expectation, the PR box will also allocate buffer sizes to achieve maximum processing of data received from and transmitted to the respective peripherals. The buffer size is chosen to provide for storage of a maximum of 256 packets without overwriting buffer space. This comprises 128 packets in a queue ready to transmit to the host and another 128 packets in a peripheral receive queue waiting to be moved to the host transmit queue. For example, channel φ buffer is initialized to 768 bytes, (¾K), to accommodate a keyboard which is a single character device. Each packet stored in the buffer received from the keyboard will be comprised of three bytes: channel number, size byte, and the data byte. To store 256 packets, the buffer allocated is 256×3=768 bytes (¾K) long. Once communication is established between the host and the PR box, the host will then interrogate each peripheral to ascertain what type of peripheral is necessary.

The main routine which the PR box runs is the background process noted above. FIG. 3C is a flowchart which describes the background process. First, in block 401, on entering this part of the firmware the function register output is turned to green.

Then, as shown by block 403 this process scans the receive and transmit queues to see if they are empty. It does this by comparing the front queue pointer to the rear queue pointer for each queue. If the front equals the rear, the queue is empty, if they are not equal, then some action must be taken. The value 1 used in the background routine is, of course, the channel number. In this case, i is added to the base values to get the necessary addresses for checking the front and rear pointers.

Figure 4A:
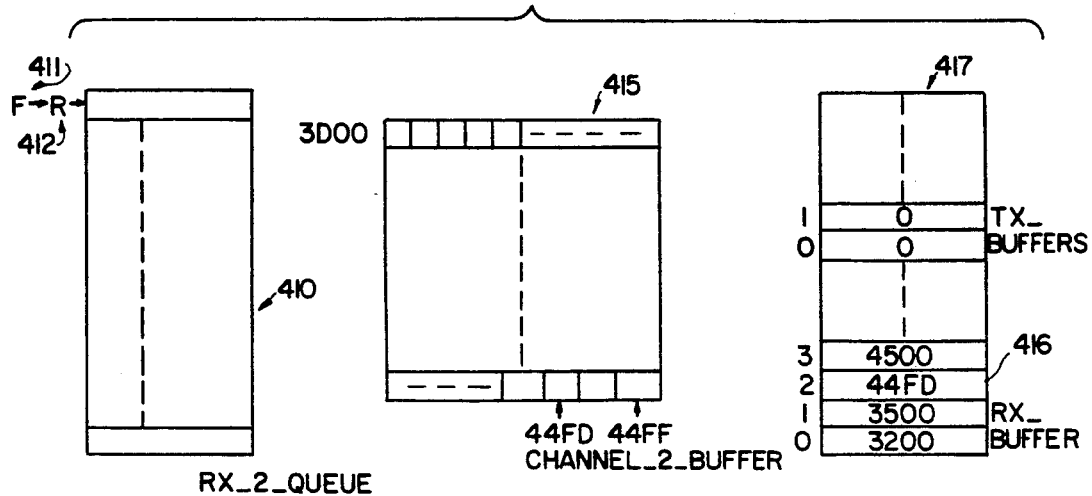
FIGS. 4A, 4B, 4C, 4D, 4E, 4F, 4G, 4H illustrate the transmission of packets through the use of circular queues and circular buffers according to the present invention.

FIGS. 4A-E illustrate what occurs when data is received in a receive queue from a peripheral and also illustrate the use of circular queues and circular buffers according to the present invention. FIG. 4A depicts the state the queues and buffers are in initially before a packet is received. Illustrated is the queue 410 for channel 2; the channel 2 buffer 415 and a table 417 containing pointers for the next available memory location for each of the receive channels Rx0-Rx7 and transmit channels Tx0-Tx7. As noted previously, data is not moved from buffer to buffer, only the addresses are moved from queue to queue. Thus, for channel 2, buffer 2 receives the data and it is also from this buffer that data is transmitted to the host. At the start of the receive for this packet, queue 410 is empty, i.e., the front pointer 411 equals the rear pointer 412. There may have been many packets received before the front and rear pointers 410 and 411 are at the top of the receive queue 410 (Rx_2_Queue). The pointer 416 for Rx2 in table 417 is pointing to the next free buffer space in buffer 415 which is 44FD Hex.

Figure 4B:
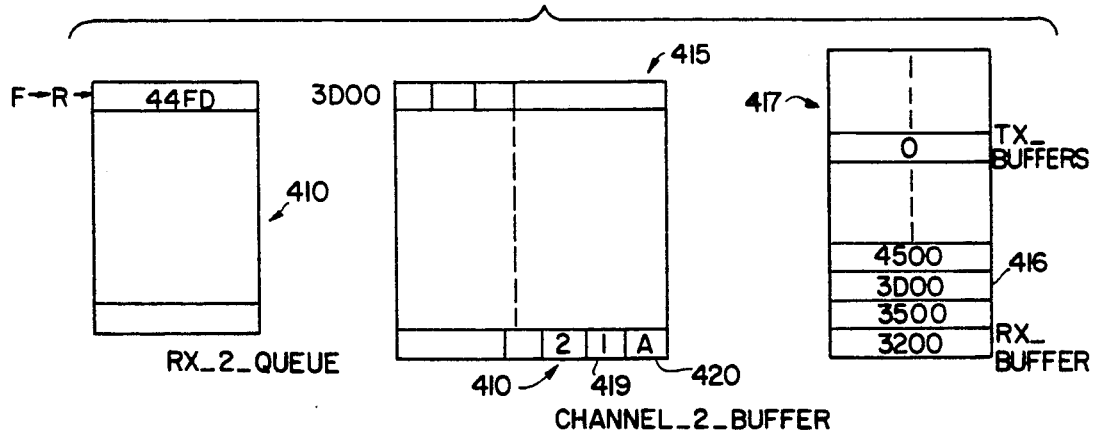

FIG. 4B depicts what occurs after the first receive interrupt on channel 2 occurs. Addresses are obtained in the manner described above by adding the channel number (2), the base addresses. A character is read, which in this example is "A" The Rx_Buffer pointer 416 address is moved into the Rx_2_Queue 410. The packet is loaded into Channel_2_Buffer 415, along with the channel number 418, the size of the packet 419, which is initialized to 1, and the character read, "A" as indicated at 420. This act causes the inter-character timer, to be explained in more detail below, for channel 2 to start.

The next free buffer space is saved in table 417 of pointer 416. The next free buffer space pointer is at 3D00 Hex. The last free buffer space pointer was at 44FF Hex which was the end location of the buffer. Instead of just bumping the free buffer space pointer to 4500 Hex and thereby going into the next SLUs data space and losing data, the free buffer space is wrapped to the start of Channel_2_Buffer. No overrun will occur because of the size of the packet and number of packets allowed as described below. This demonstrates the use of circular buffers in the PR box software.

Figure 4C:
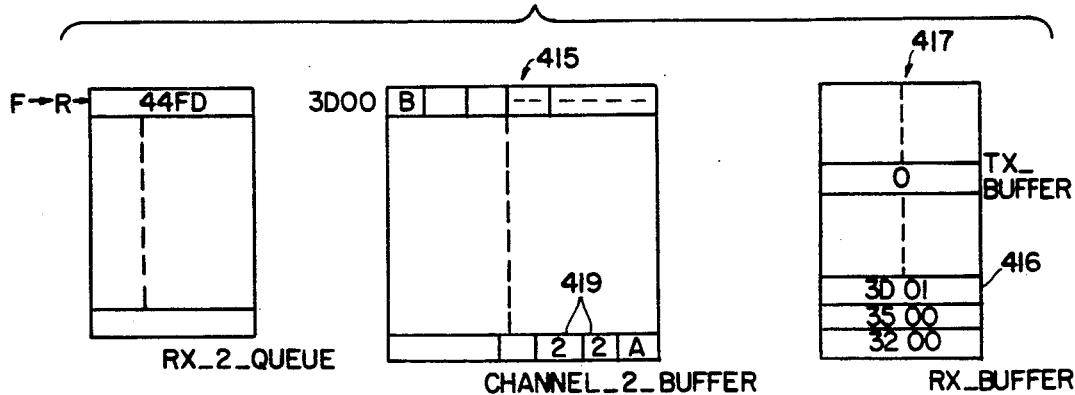
Figure 4D:
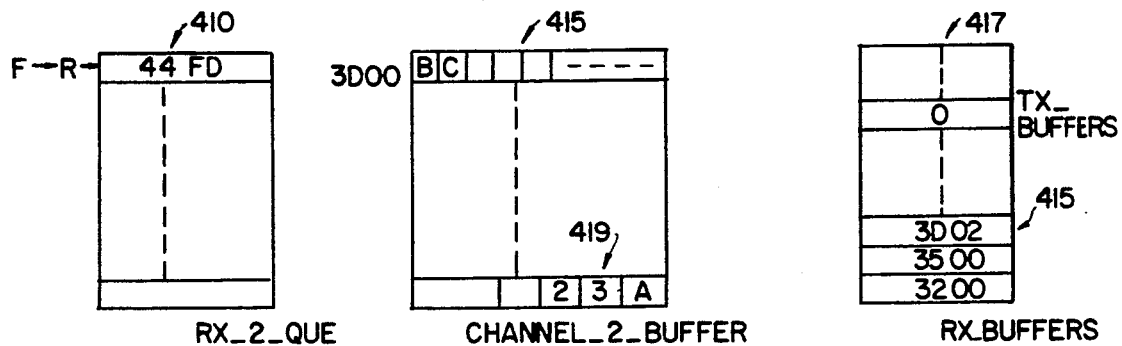

The same sequence of events as described above and depicted in FIG. 4B are repeated as shown in FIG. 4C and FIG. 4D. The character (B and C) are read and stored at the start of the channel 2 buffer 415 and the packet size 419 is incremented accordingly. Each character is moved to the address in Channel_2_Buffer 415 that pointer 416 (free buffer space pointer) of the table 417 indicates. Pointer 416 is incremented and the intercharacter timer is re-started. This sequence of events continues until the inter-character timer expires.

FIGS. 4A-E have been simplified to show only one packet in each queue at a time. In reality, each queue may have multiple entries and each port may be receiving/transmitting packets concurrently. Having a transmit queue, a receive queue, a buffer and associated pointers dedicated to each channel in the PR box makes this operation possible.

Figure 4E:
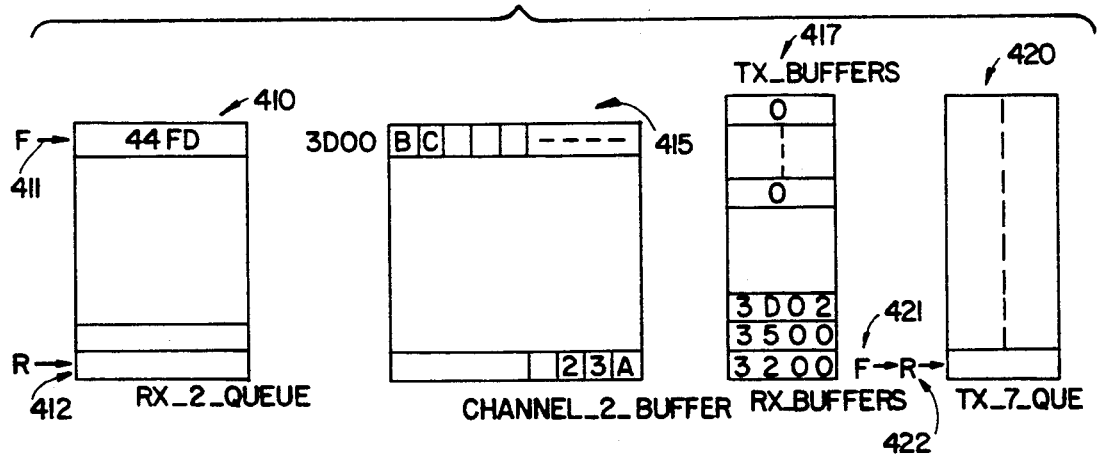

FIG. 4E shows that once the inter-character timer expires, the rear pointer, 412, is bumped to the next free location (FE Hex+2=00). This brings the rear pointer to the start of the queue thus again demonstrating the use of circular queues in PR box software as a result of the previously explained use of the P2 and R0/R1 registers.

All received and transmitted data from the PR box is handled by interrupt routines. There are routines, which occur for example, during the steps of FIGS. 4A-4E, to set up the data packets to be sent from the peripherals to the host. These packets are considered complete if the number of characters received for that peripheral equals the maximum packet size allowed, which is six bytes, or if there is a timeout of the intercharacter timer for that peripheral. For example, the tablet report size is 5 bytes so after the fifth byte it will time out and be a completed packet. Intercharacter timeout occurs if approximately two character times pass without reception of a byte.

Peripheral timeout is handled by intercharacter timers that are initialized before the initialization code starts. The value that is loaded into the timer is related to the baud rate. There is a timer location for each channel. Table of FIG. 6 contains a list of the timer values used for the different baud rates. The timer values are decremented in a timer 0 interrupt routine, described in detail below in connection with FIG. 7A-E. For example, consider the case where the tablet sends a report which is 5 bytes long at 4800 baud. At 4800 baud and 11 bits per character, it will take approximately 2.3 msecs per character for transmission. Then in the case of this report being sent, the timer would expire after about 5 msec and the buffer would be marked as complete.

As disclosed above in connection with FIG. 4B, when the first character is received on ports 0-6 (peripheral ports), the address of the first free space in that ports' buffer 415 is stored in the queue 410. The current port number is stored in that location at 418. The next buffer location 419 is the size, and will be initialized to 1. Finally, the character which was read in e.g. A, is stored in the buffer. Subsequent bytes are be stored in the buffer 415, and the size byte 419 is incremented.

Thus, after each byte is read, a timer for that port is initialized to approximately twice the transmit time for a single character. This intercharacter timer value is adjusted if the host changes the baud rate on any channel. The packet is closed, and the ith rear pointer 412 of FIG. 4A-E is bumped by 2 when the timer counts to zero (times out), or the size equals 6, where i is the channel number, as shown in FIG. 6E.

Figure 4F:
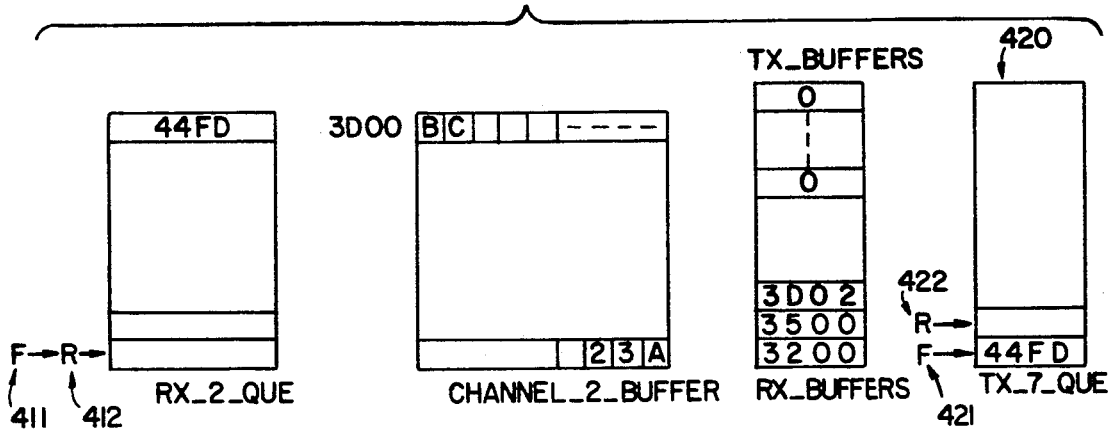

After the background process sees a nonempty Rx queue, e.g. as in FIG. 4E the buffer address at the front 411 of the receive queue is moved to the rear 422 of the Tx-7 queue (host) 420. The front receiver pointer 411 or the Rx queue is bumped to the next location (which may or may not have any more data buffers to send), and the rear 422 of the Tx_7_Oue is bumped to the next free location. This is shown in FIG. 4F.

In general, the transmitter is turned on for port 7, if it is not already on, if an ACK/NACK or a Keep Alive needs to be sent, or the queue is not empty. If the command queue is not empty, then the command parser is executed. Transmitter interrupts turn themselves off when the last character is sent. The background routine, transmit, receive, and time interrupts all run asynchronously to each other.

Thus, if the receive queue is not empty and the queue is for port 0-6 or the command queue, then the queue entry at the front of that queue is pushed onto the rear 422 of the transmit queue 420 for port 7. The front 411 of the receive queue at which the entry was just taken off is incremented by two as explained above in connection with FIG. 4F. What has just been described is how information is received from a peripheral into a buffer and the buffer locations stored in a receive (Rx) queue and then transferred to the Tx_7_Que to be transmitted to the host.

Packets from the host for the peripherals (0-6) or the PR box (the command channel) are handled in similar fashion, first with the locations stored in the RX_7 queue and then being transferred to a respective Tx queue.

If the receive queue for port 7, Rx_7_Que (the host) is not empty, then the first byte of the buffer (at the queue entry) contains the port where the entry should be directed. That port value is used to select the appropriate transmit queue, and the buffer address+1 is the value which is pushed onto that transmit queue. If the destination is for port 7 (i.e., a command to the PR Box), then this is pushed onto the command queue.

The first character received on port 7 must be an ACK, NACK, or an SOH. If it is an SOH, the PR Box will expect to receive a packet. All following characters are stored in the channel 7 buffer. After the last data character is read, the received checksum is compared with the calculated checksum. If they are equal, an ACK is sent to the host, and the rear pointer for channel 7 is bumped by 2. If the checksum does not match, or the inter-character timer expires (10 msec for the host), a NACK is sent to the host, and the rear pointer for channel 7 is not incremented (The PR Box ignores the data it stored).

Once an entry is pushed onto a transmit queue for ports 0-6 and it is not empty, the transmitter interrupt is turned on for this channel, if it is not already on.

A transmit interrupt on ports 0-6 will take the address at the ith transmitter queue front pointer for the buffer to transmit. The first byte is the size, which is not transmitted, but the subsequent bytes are transmitted until the size is zero. When the interrupt is finished transmitting all the data bytes, the front pointer for the ith transmitter is bumped by two, and the interrupt for that port is turned off.

A transmit interrupt on port 7 could be for a few reasons such as, to send an ACK, NACK, or a packet to the host. A transmit interrupt on port 7 (Host port) will reinitialize the keep alive timer to 10 seconds.

Figure 4G:
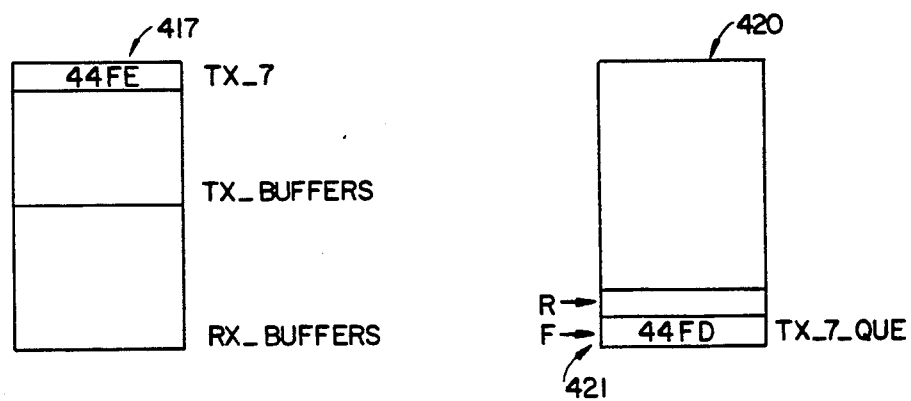
Figure 4H:
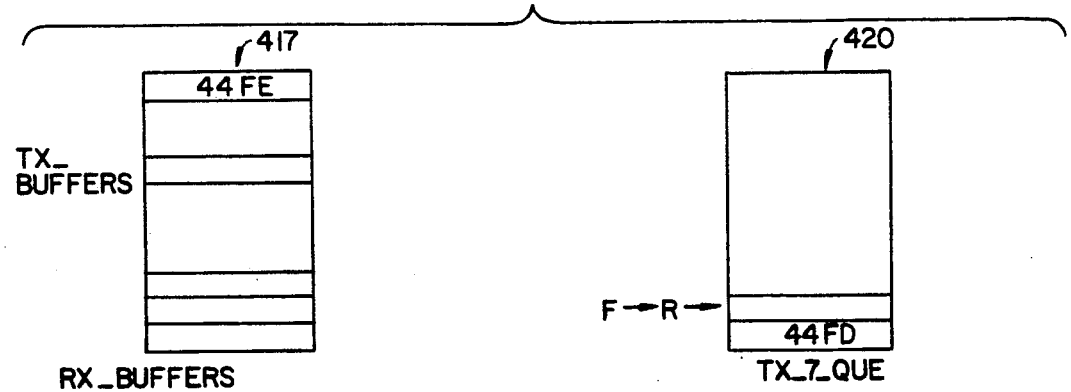
Figure 7B:
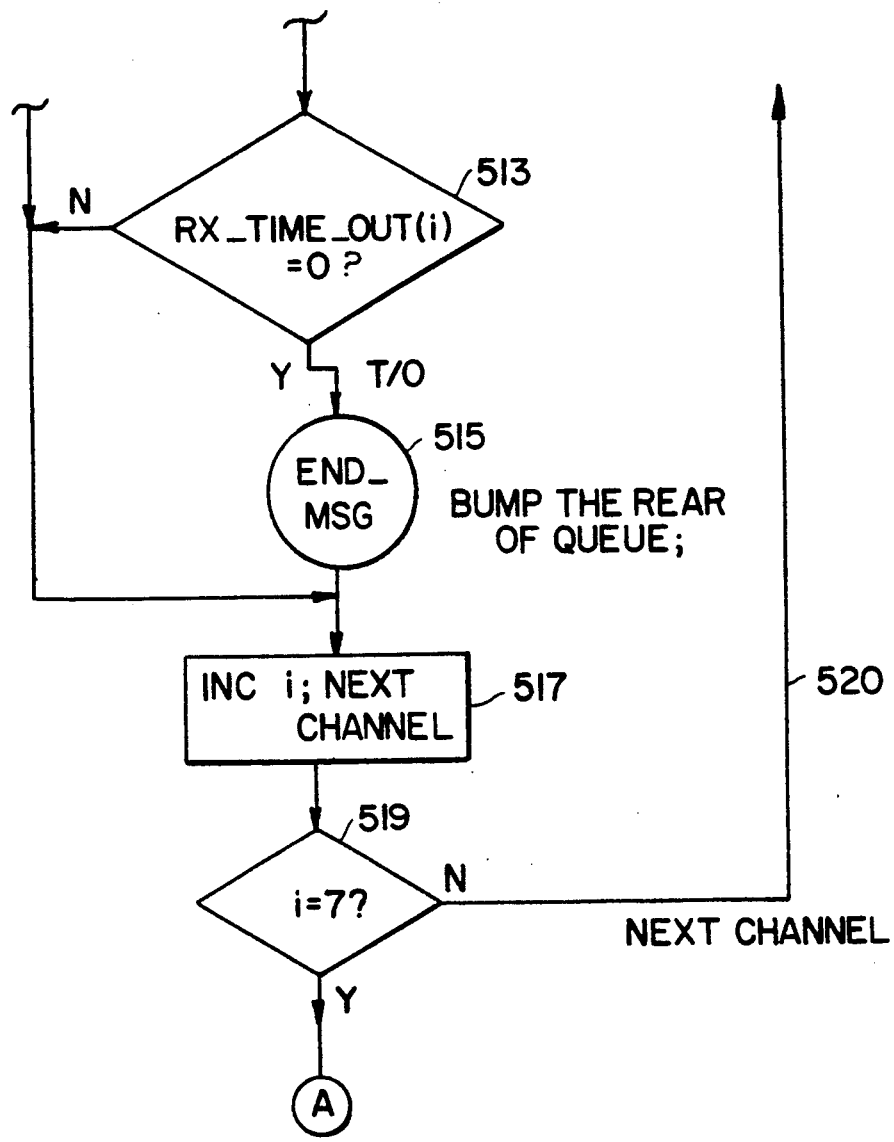
Figure 7D:
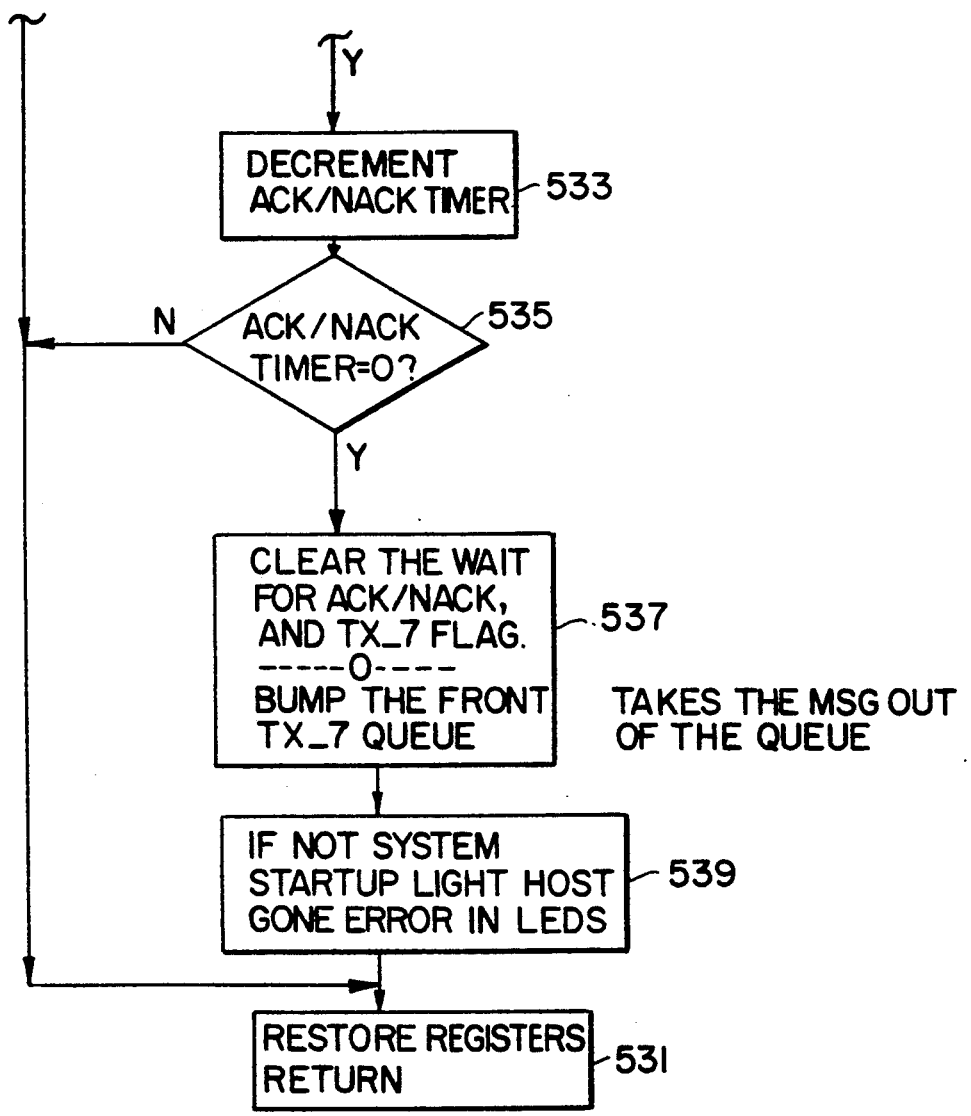
Figure 7E:
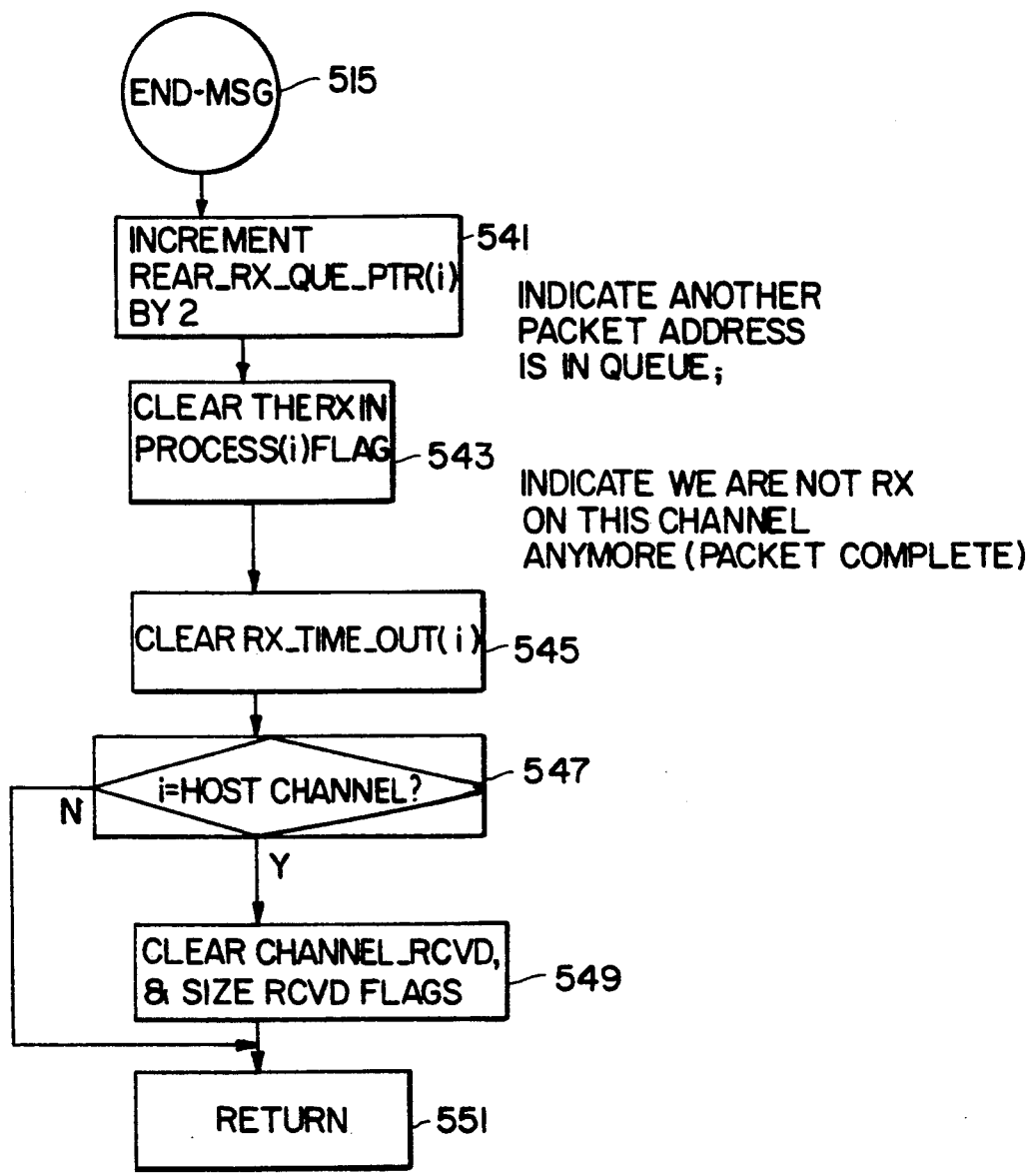

If the PR box is to send a packet to the host, the first time in the interrupt, it will send an SOH. The second time in the interrupt routine it will get the packet address pointed to by the front pointer 421 for the channel 7 transmitter queue 420 as shown in FIG. 4G. The first byte at that address will be the channel which the packet is from. The PR box takes this byte, sends it and stores the address of the next byte to send in Tx_Buffers table 417 at the location for channel 7. For example, FIG. 4G illustrates transmitting the information for channel 2 which was obtained as shown in FIGS. 4A-E. The next time in, it will send the size of the packet, and use the size to send the subsequent data bytes, until the size is zero. As each byte is sent, the Tx buffer (7) is incremented to point to the next byte. As each byte is sent, it is also calculated into the checksum, and the checksum is then sent when the size is zero. After the checksum is sent, a timer is initialized to 20 mSec in order to wait for an ACK or a NACK, and the interrupt is turned off. If an ACK is received, the front pointer for channel 7 will be bumped by two as shown in FIG. 6H. If the timer expires, this pointer will be bumped by two, and the LEDs will have the error code to indicate the host did not respond. Another packet cannot be sent to the host until an ACK/NACK is received, or the timer expires.

As noted above, the host sends data to a physical channel address. The host keeps a table indicating which device is plugged into a particular channel. The host can tell which device is on a particular channel by requesting the device to send a self-test report. This is done for devices having common connectors that can be interchanged (i.e., the mouse and tablet, dial box and digit box, etc.). The PR box tries to determine if a device is connected to a channel by looking for the device present bit. The mouse, tablet, buttons box, dial box, and spare keyboard channels have device present bits. By using these, the PR box can tell that there is a device out there, but not what device it is.

When the PR box sends the self-test report, one byte is the current configuration of the system (only those devices that have a device present bit). There is no attempt made to try to identify if there is a device on the spare channel, host channel, or the keyboard channel.

A receive interrupt will occur on channels 1-4 and 6 if a device is plugged/unplugged. If this occurs, a message is sent to the host. The host then interrogates that port to see which peripheral, if any, is present and records that information in a table. It then sets baud rates by sending a command to the peripheral and then a command to the PR box to set the UART baud rate for the port in question. Baud rates may be reset at other times by the host to, for example, slow down transmission of a data where excessive transmission errors are encountered.

The Timer 0 interrupt contains the counters for the inter-character timers, counters for a port which was previously turned off, and the ACK/NACK counter. FIG. 7A-E is a flow diagram illustrating the Timer 0.

As indicated by FIG. 7A the timer interrupt occurs approximately every 1.38 msec. Upon the occurrence of an interrupt, as indicated by block 501, registers are saved and the register banks changed. The time to the next interrupt is then loaded as 1.38 msec. as indicated by block 503. The next step is to get the base address of the receiver timeout table of intercharacter timers. This table contains the same information which is contained in FIGS. 5 and 6 hereof, i.e. for each channel it gives the value for the intercharacter timing. The next block indicates that the process starts with i equal to 0. In other words, as block 507 indicates, it starts with channel 0. A decision block 509 is entered in which, the first time through, a check is made to see if the timeout for receiver i is equal to 0. If it is not equal to 0, block 511 is entered and the timeout is decremented by 1. A check is made again in decision block 513 to see if timeout has reached 0. If the answer is yes then it is the end of the message as indicated by block 515 and, as indicated above, the rear of queue i is bumped. In decision block 509 if timeout is equal to 0 this means there is nothing to be done for this channel. If the answer in decision block 513 is no, this means that timeout has not occurred. In either case, block 517 is entered and i is incremented to the next channel. Following this a decision block 519 is entered to see if i is equal to 7. If not, the program loops back by a loop 520 to decision block 509 to check timeout for the next channel. When channel 7 is reached, as indicated by a yes answer from block 519, decision block 521 is entered. Here a check is made to find out if the PR box is receiving on the host channel. If it is, according to block 521 timeout is decremented by 1. Then in block 523 a check is made to see if timeout is equal to 0. If it is, there is a timeout on the host channel and a number of steps are taken as indicated in block 525. If timeout has not occurred, the program proceeds directly to block 527. As indicated therein, a check is then made for a timeout on a port which was turned off. This is done using the same series of steps just described.

After passing through block 527, a decision block is entered to see whether or not the PR box is waiting for an ACK or NACK. If the answer in decision block 529 is no, block 531 is entered immediately which indicates that the registers are restored and a return from the interrupt to the main program. If the PR box is waiting then block 533 is entered and the ACK/NACK timer is decremented. Next, a check is made in block 535 to see if the timer is at 0. If it is not, block 531 is entered. Otherwise, if it is 0, the wait for ACK/NACK and the transmitter 7 flag is cleared and the front pointer for the transmitter 7 queue is bumped as indicated by block 537. Next, block 539 is entered and if it is not system start up the host gone error is lighted in the LEDs 52 of FIG. 2. After this, block 531 is again entered. As shown in FIG. 9C, when end message 515 is encountered, as shown by block 541, the rear pointer for the receiver associated with the ith channel for which the message had ended is incremented by 2. Next, as indicated by block 543, the receive in progress flag is cleared followed by clearing of the receive timeout as indicated by block 545. Next, a check is made in decision block 547 to see if i is equal to the host channel. If it is, the actions taken in block 549 are carried out. When this done, or if the answer in block 547 was no, then the program returns to block 517 of FIG. 9A. (END_MSG is used elsewhere in the firmware also.)

A timer is only decremented if it is non-zero. If it is non-zero, and transitions to zero, some action is taken. If an inter-character timer expires, then the rear pointer 412 for the ith receiver is bumped by two. If a timer for a port which was previously off expires, then that port is turned on. A port is turned off when it gets too much data, and overflows its queue. The port is then turned off for 10 mSec. If the ACK/NACK timer expires, then the front pointer 421 for channel 7 transmitter is bumped by two, and the error for the host not responding is placed in the LEDs 57.

The Timer 1 interrupt contains the counter for the "keep alive" timer. It is decremented by 1 on each entry. If it transitions to zero, a flag is set so the background process of FIG. 5C will send a "keep alive" message to the host.

The interrupt routines to receive packets from the host, thus, set them up in memory for the background process of FIG. 5C to decipher. This background process also sets up the process for the interrupt routines to send data packets to the host and the peripherals.

Packet Definition

As noted above, bytes received by the PR box from a peripheral are grouped into a packet to be sent to the host. The packet definition is as follows:

| | | |
|---|---|---|
| SOH | 1 byte: | Decimal 1 |
| Header | 1 byte: | See FIG. 10 |
| Byte Count | 1 byte: | Number of message/ Message/Data Text data bytes |
| . | | Message/Report/Data bytes, length dependent on peripheral device |
| . | | |
| . | | |
| Checksum | 1 byte: | Checksum for total transmisison |
| Response to the above packet: | | |
| ACK/NAK | 1 byte: | Decimal 6/21 |

Figure 8:
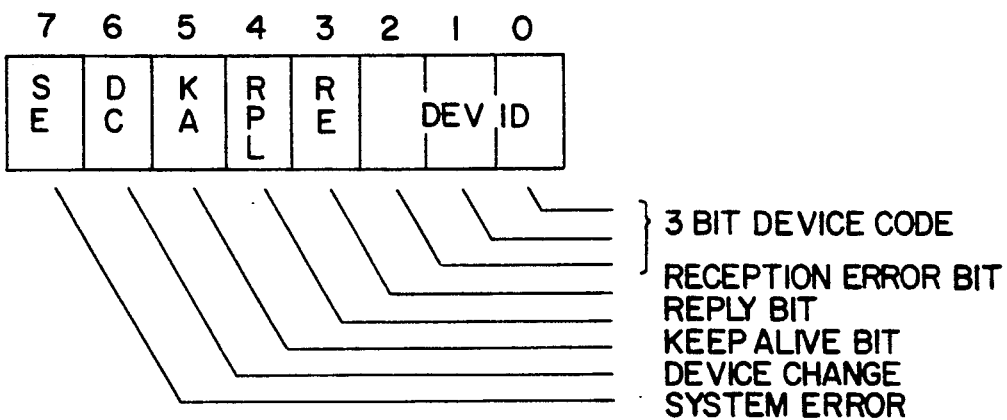
FIG. 8 is a diagram showing the configuration of the header byte field utilized with the present invention.

The header byte field is illustrated in FIG. 8.

The three bit device code utilizes all available bits. There are device codes for the keyboard, mouse, tablet, dial box, button box, PR box system and two spare ports. The host channel is considered to be part of the PR box system, i.e. the host channel uses a DEV ID of 111.

| Code | Device |
|---|---|
| 000 | Keyboard (DEC LK201) |
| 001 | Mouse |
| 010 | Tablet |
| 011 | Dial Box |
| 100 | Button Box |
| 101 | Spare Channel |
| 110 | Spare keyboard |
| 111 | PR Box including Host Channel |

The reception error bit of FIG. 8 is used to indicate a problem with the associated device identified by the device code. This bit will be set when the PR box sees a parity, framing, or hardware overrun error on the UART associated with the device.

Reception Error Bit=logical 1 to indicate an error has occured.

The Reply bit is used to indicate the host that the PR box is responding to a request made by the host and that the report or data following is not being originated by the PR box or peripheral device. This bit is used for a response to the commands T and R discussed below under Self Test Command and Status Report Command, respectively.

Reply Bit=logical 1 to indicate this is a response to a previous request from the host. Used only for PR box commands.

The Keep Alive bit is used to send null transmissions to the host within a specified time (e.g. 10 seconds) if there has been no transaction in that time period. The host watchdog timer is set to 10 seconds. This functionality tells the host that the PR box is still connected but has not data to transmit. The host resets its watchdog timer and starts the cycle again.

Keep Alive—logical 1 to indicate keep alive function only.

The Device Change bit is set to indicate that a device with a device present bit has been connected/disconnected to/from the PR box. When this bit is set, the packet contains one message byte. This is the configuration byte. The configuration byte will have one bit set for every device that has a device present pin that is plugged into the system.

Device Change Bit—logical 1 to indicate a device has changed state.

The System Error bit is used to send error reports to the host. When this bit is set, there is one data byte in the packet. That data byte is the error code. The error codes that currently exist are:

1. 01H - Bad command sent from host.
2. 02H Device Queue has had an overflow.

Two methods of error detection are utilized:
1. Checksum for the transmission (add with carry)
2. Odd parity for each byte.

If the Keep Alive bit is set, the Reply bit and Error bit are ignored by the host. The DEV ID with Keep Alive must be the PR box device.

The Transmission Protocol

The transmission protocol is as follows:

The originating device sends its data and waits for an ACK (all OK) or a NAK (something doesn't track, retransmit). Status information is a little bit different, in that the originating device, host will be expecting something other than the ASCII ACK/NAK character back. This is where the Reply bit is used.

If a NAK is received by either the PR box or the host, the source device will retransmit the previous transmission. The device which sent the NAK will flush the previous transmission and respond to the re-transmission as a new request.

Figure 9A:
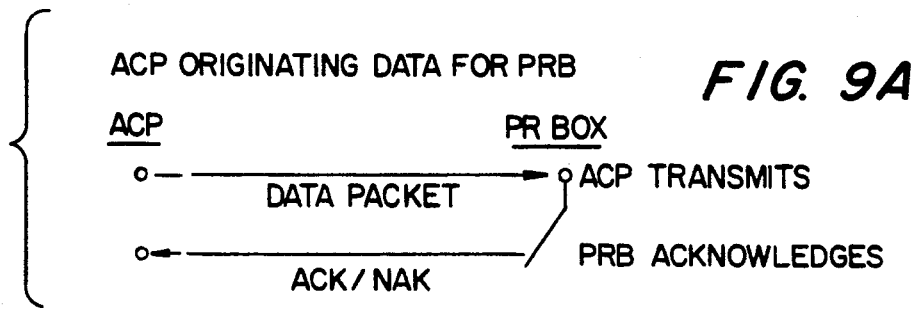
FIGS. 9A, 9B, 9C are diagrams showing the message transmission protocol of the present invention.
Figure 9B:
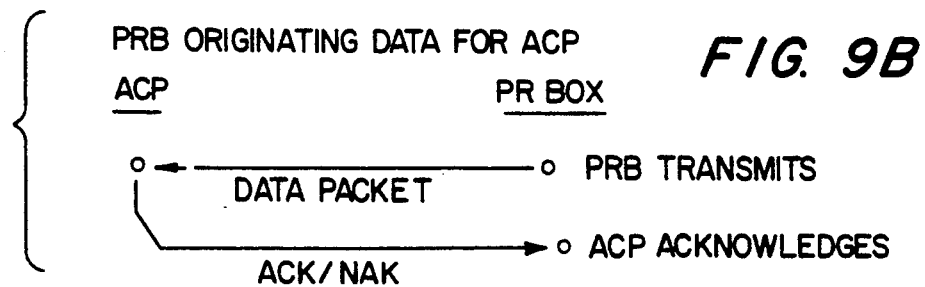
Figure 9C:
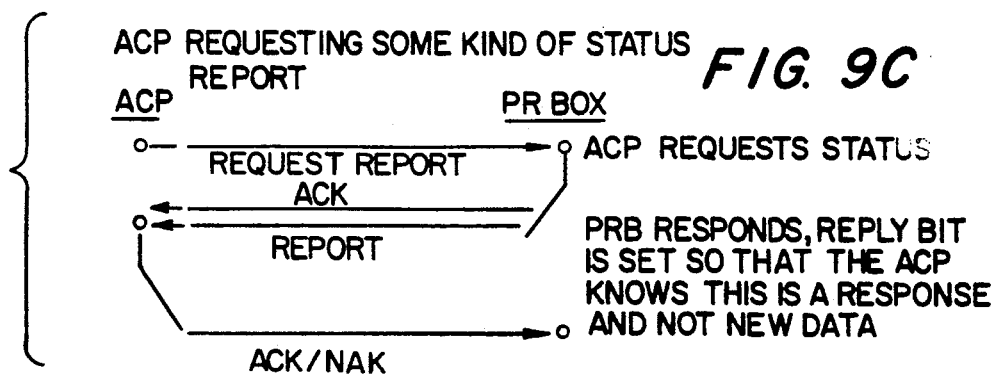

Illustrative diagrams are shown in FIG. 9A-C which respectively show host originated data; PR box originated data and a report request by the host.

When a self-test command is transmitted directly to a peripheral, i.e. as regular data, the response coming back will be handled the same way, i.e. as data, and the Reply bit will not be set and the DEV ID will be that of the peripheral device. The PR box has no special commands to individually test individual peripherals.

When a device overrun error occurs, data may be lost. When the PR box gets an overrun error, and continues to receive data from that device before it can empty out its queue, the receive for that device is turned off for 10 mSec.

After 10 mSec., the receive is turned on again, and the data that comes in is placed in the queue to send to the host. During the 10 mSec. that receive is off, data is lost.

Data from a peripheral is limited by the PR box to a maximum of six bytes per packet. If a peripheral sends out more than six consecutive data bytes without any null time period between the bytes, the PR box will make separate packets with a maximum of six data bytes. The packets from the host to the PR box do not have a data limit check. However, the host should limit the data size in a packet to nine data bytes for safety. The PR box can safely store up to 256 packets of nine data bytes, and warn the host on a queue overflow condition. If the host sends larger packets, it should send them less frequently, i.e. 128 packets of 18 data bytes, etc., with a bigger time gap between packets.

As explained above, packeting of data from devices is handled by timers. When the PR box "sees" a "null" time period equal to two times the character length of a peripheral, the packet is closed off and placed in the queue to send to the host. (See the example above.) There is also a default for a transmission from the host of 10 mSec. null time in between two bytes of a packet. If this timer expires a NAK will be sent to the host. If the default speed of the host is changed, the timer will revert to a time period of two times the character length.

As previously described, there are also timers for the Keep Alive (about 10 SEC) and ACK/NAK (about 20 mSec)

Commands to the PR Box

Self-Test Command

T—Test PR System and send the self-test report (including the configuration).

Note: Test T will temporarily disconnect the PR Box from the host for less than 10 seconds.

Status Report Command

R—Report status of PR System, including Peripherals configuration.

Change Baud Rate Command (two forms)

0 Cnx—where "n" is the channel number (0—keyboard ... 7-PR-Host link), and "x" is the baud rate.

0 Cnxyz—where "n" is the spare channel (5), "x" is the baud rate, "y" is the parity (ASCII O (Hex 4F)—for odd, ASCII E (Hex 45)—for even, or ASCII N (Nex 4E)—for none), and "z" is the bits/char (Hex 5, 6, 7, or 8)/.

Note: The Parity and Bits/char can only be changed on the spare port, however, the baud rate on the spare channel can be changed without changing the parity and bits/char. The other ports can only have the baud rate changed.

The following is the table of baud rates (x):

| Baud Rate | Hex Code |
|---|---|
| 50 | 00 |
| 75 | 01 |
| 110 | 02 |
| 134.5 | 03 |
| 150 | 04 |
| 300 | 05 |
| 600 | 06 |
| 1200 | 07 |
| 1800 | 08 |
| 2000 | 09 |
| 2400 | OA |
| 3600 | OB |

| Baud Rate | Hex Code |
|---|---|
| 4800 | OC |
| 7200 | OD |
| 9600 | OE |
| 19200 | OF |

What is claimed is:

1. In a system including a host, a peripheral repeater and at least one peripheral, a method of packetizing data in said peripheral repeater and sending it to said host, comprising:
   establishing a message byte length;
   accumulating characters in messages from a given peripheral into packets; and
   terminating and sending a packet when its size is equal to said message byte length;
   wherein each peripheral has an established baud rate, and further including terminating a packet and transmitting the packet after having received at least one byte if a predetermined time, based on said baud rate, passes from the time a last byte was received without receiving a subsequent byte from the peripheral.

2. The method according to claim 1 wherein said time is approximately equal to the transmission time required to transmit two characters at said rate.

3. The method according to claim 2 wherein the baud rate of said peripheral is changeable and further including adjusting said time when the baud rate is changed.

4. In a system including a host and a peripheral repeater having at least one peripheral coupled thereto, a method of packetizing data from said peripheral at said peripheral repeater and sending it to said host comprising:
   a) establishing a baud rate for said peripheral;
   b) accumulating bytes in messages from said peripheral into packets at said peripheral repeater; and
   c) terminating a packet and transmitting said packet to the host after said peripheral repeater has received at least one byte is a predetermined time based on said baud rate passes from the time a last byte was received without receiving a subsequent byte from the peripheral.

5. The method according to claim 4 wherein said time is approximately equal to the transmission time required to transmit two characters at said rate.

6. The method according to claim 4 wherein the baud rate of said peripheral is changeable and further including adjusting said time when the baud rate is changed.

7. The method according to claim 4 and further including:
   a) establishing a message byte length; and
   b) terminating and sending a packet when its size is equal to said length.

* * * * *